(12) United States Patent
Nave et al.

(10) Patent No.: US 11,500,545 B2
(45) Date of Patent: Nov. 15, 2022

(54) ADAPTIVE TAPE LIBRARY AND HUMIDITY-BASED DRIVE OPERATIONS

(71) Applicant: International Business Machines Corporation, Armonk, NY (US)

(72) Inventors: Shawn M. Nave, Tucson, AZ (US); Lee Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 16/732,669

(22) Filed: Jan. 2, 2020

(65) Prior Publication Data

US 2021/0208793 A1 Jul. 8, 2021

(51) Int. Cl.
*G06F 3/06* (2006.01)
*G11B 5/008* (2006.01)

(52) U.S. Cl.
CPC .......... *G06F 3/0619* (2013.01); *G06F 3/0634* (2013.01); *G06F 3/0686* (2013.01); *G11B 5/00813* (2013.01)

(58) Field of Classification Search
CPC .... G06F 3/0619; G06F 3/0634; G06F 3/0686; G11B 5/00813
See application file for complete search history.

(56) References Cited

U.S. PATENT DOCUMENTS

| | | | |
|---|---|---|---|
| 6,661,596 B2 | 12/2003 | Chliwnyj et al. | |
| 6,676,026 B1 | 1/2004 | McKinley et al. | |
| 6,843,068 B1 * | 1/2005 | Wacker | F24F 11/30 165/223 |
| 7,924,663 B2 | 4/2011 | Grow et al. | |
| 9,852,758 B1 | 12/2017 | McIntosh et al. | |
| 9,888,615 B1 | 2/2018 | Frink et al. | |
| 9,916,871 B1 * | 3/2018 | Miranda Gavillan | G11B 17/22 |
| 9,940,976 B1 | 4/2018 | Gale et al. | |
| 10,004,165 B1 * | 6/2018 | Bailey | H05K 7/20745 |
| 10,026,445 B1 | 7/2018 | Gale et al. | |
| 10,417,851 B2 | 9/2019 | Gale et al. | |
| 10,418,071 B2 | 9/2019 | Gale et al. | |
| 10,426,057 B2 | 9/2019 | Jesionowski et al. | |
| 2002/0163751 A1 * | 11/2002 | Chliwnyj | G11B 15/43 360/73.08 |
| 2008/0022157 A1 * | 1/2008 | Chang | G06F 11/0727 714/42 |
| 2012/0260023 A1 * | 10/2012 | Nagai | G06F 21/81 711/103 |
| 2012/0320472 A1 * | 12/2012 | Thompson | G11B 23/502 360/132 |

(Continued)

OTHER PUBLICATIONS

Mcintosh et al., U.S. Appl. No. 15/367,445, filed Dec. 2, 2016.
(Continued)

*Primary Examiner* — Andrew J Cheong
(74) *Attorney, Agent, or Firm* — Zilka-Kotab, P.C.

(57) ABSTRACT

A method includes receiving a humidity level in a tape library and determining whether the humidity level is in a predefined range indicative of safe operation. In response to determining that the humidity level is in the predefined range, the method includes allowing performance of operations on magnetic recording tapes. In response to determining that the humidity level is not in the predefined range, the method includes preventing performance of the operations on magnetic recording tapes. A drive-implemented method includes detecting a humidity level within a housing of a tape drive and determining whether the humidity level is in a predefined range indicative of safe operation.

24 Claims, 11 Drawing Sheets

(56) References Cited

U.S. PATENT DOCUMENTS

| | | | |
|---|---|---|---|
| 2014/0185161 A1* | 7/2014 | Gale | G11B 5/41 360/90 |
| 2015/0211757 A1* | 7/2015 | Mutchnik | F24F 11/30 454/256 |
| 2017/0011777 A1* | 1/2017 | Iben | G11B 33/1406 |
| 2017/0323666 A1 | 11/2017 | Jesionowski et al. | |
| 2018/0267718 A1 | 9/2018 | Gale et al. | |
| 2018/0268860 A1 | 9/2018 | Miranda Gavillan et al. | |
| 2018/0268861 A1 | 9/2018 | Miranda Gavillan et al. | |
| 2018/0268863 A1 | 9/2018 | Gale et al. | |
| 2018/0268872 A1 | 9/2018 | Gale et al. | |
| 2019/0045280 A1* | 2/2019 | Bambrick | H04Q 9/00 |

OTHER PUBLICATIONS

Gale et al., U.S. Appl. No. 15/460,389, filed Mar. 16, 2017.
Sale et al., U.S. Appl. No. 15/460,397, filed Mar. 16, 2017.
Gale et al., U.S. Appl. No. 15/460,403, filed Mar. 16, 2017.
Gale et al., U.S. Appl. No. 15/460,420, filed Mar. 16, 2017.
Gavillan et al., U.S. Appl. No. 15/460,456, filed Mar. 16, 2017.
Gavillan et al., U.S. Appl. No. 15/460,472, filed Mar. 16, 2017.
Gale et al., U.S. Appl. No. 15/460,497, filed Mar. 16, 2017.
Anonymous, "A Method and System for Sensing Temperature and Humidity Difference in an Automated Tape Library," IP.com Prior Art Database, Technical Disclosure No. IPCOM000239456D, dated Nov. 8, 2014, pp. 1-4.
Cancio et al., "Experiences and challenges running CERN's high capacity tape archive," 21st International Conference on Computing in High Energy and Nuclear Physics, Journal of Physics: Conference Series 664:042006, 2015, pp. 1-8.
IBM, "Wireless Distributed Environment Supervision System for Tape Libraries," IP.com Prior Art Database, Technical Disclosure No. IPCOM000134955D, dated Mar. 24, 2006, pp. 1-3.
Jesionowski et al., U.S. Appl. No. 15/146,833, filed May 4, 2016.

* cited by examiner

ADAPTIVE TAPE LIBRARY AND HUMIDITY-BASED DRIVE OPERATIONS

BACKGROUND

The present invention relates to data storage systems, and more particularly, this invention relates to tape media and drive protection in a tape library with low humidity conditions.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or discs), electronic media (such as PROM, EEPROM, flash PROM, CompactFlash™, Smartmedia™, Memory Stick®, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a frontmost tier to a rearmost tier.

A continuing effort in the data storage industry includes improving the efficiency of data centers in terms of cost and environmental impact. Many customers wish to optimize data center operating margins to improve the cost efficiency of data centers.

Data centers with free-cooling facility environments have wider ranges of temperature and relative humidity than traditional data centers with dedicated computer room air conditioners (CRACs). While servers and disk-based storage equipment may be able to operate within these wider ranges, tape storage equipment cannot operate reliably in the extreme limits of these conditions.

Self-cooling libraries include automated tape libraries that are appropriately sealed and fitted with integral air conditioning. Self-cooling libraries control the temperature and the relative humidity of the environment in the library so that the contained tape drives and tape media operating conditions are acceptable.

Data storage media and/or data storage equipment may be damaged if the ambient temperature and/or the relative humidity of the air entering the tape library and/or tape drive is outside the safe and/or functional operating limits of the data storage media and/or data storage equipment.

SUMMARY

A method, according to one embodiment, includes receiving a humidity level in a tape library and determining whether the humidity level is in a predefined range indicative of safe operation. In response to determining that the humidity level is in the predefined range, the method includes allowing performance of operations on magnetic recording tapes. In response to determining that the humidity level is not in the predefined range, the method includes preventing performance of the operations on magnetic recording tapes.

A system, according to yet another embodiment, includes a processor and logic integrated with the processor, executable by the processor, or integrated with and executable by the processor. The logic is configured to perform the foregoing method.

A computer program product, according to yet another embodiment, includes a computer readable storage medium having program instructions embodied therewith. The program instructions are executable by a computer to cause the computer to perform the foregoing method.

A drive-implemented method, according to another embodiment, includes detecting a humidity level within a housing of a tape drive and determining whether the humidity level is in a predefined range indicative of safe operation. In response to determining that the humidity level is in the predefined range, the drive-implemented method includes allowing performance of operations on magnetic recording tapes. In response to determining that the humidity level is not in the predefined range, the drive-implemented method includes preventing performance of the operations on magnetic recording tapes.

A system, according to yet another embodiment, includes a processor and logic integrated with the processor, executable by the processor, or integrated with and executable by the processor. The logic is configured to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a method includes receiving a humidity level in a tape library and determining whether the humidity level is in a predefined range indicative of safe operation. In response to determining that the humidity level is in the predefined range, the method includes allowing performance of operations on magnetic recording tapes. In response to determining that the humidity level is not in the predefined range, the method includes preventing performance of the operations on magnetic recording tapes.

In another general embodiment, a system includes a processor and logic integrated with the processor, executable by the processor, or integrated with and executable by the processor. The logic is configured to perform the foregoing method.

In yet another general embodiment, a computer program product includes a computer readable storage medium having program instructions embodied therewith. The program instructions are executable by a computer to cause the computer to perform the foregoing method.

In another general embodiment, a drive-implemented method includes detecting a humidity level within a housing of a tape drive and determining whether the humidity level is in a predefined range indicative of safe operation. In response to determining that the humidity level is in the predefined range, the drive-implemented method includes allowing performance of operations on magnetic recording tapes. In response to determining that the humidity level is not in the predefined range, the drive-implemented method includes preventing performance of the operations on magnetic recording tapes.

In another general embodiment, a system includes a processor and logic integrated with the processor, executable by the processor, or integrated with and executable by the processor. The logic is configured to perform the foregoing method.

Figure 1:
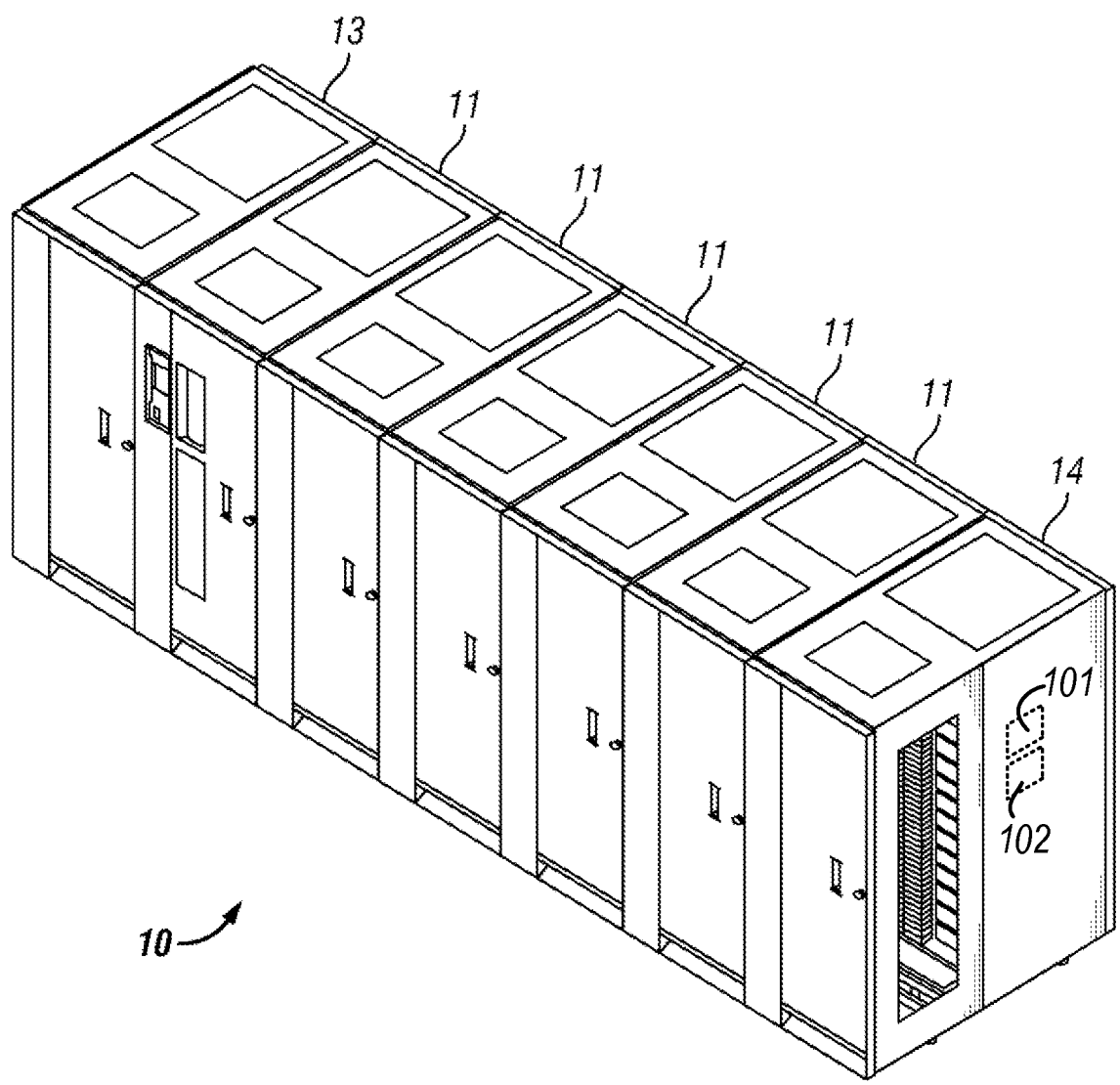
FIG. 1 is a perspective view of an automated data storage library in accordance with one embodiment of the present invention.
Figure 2:
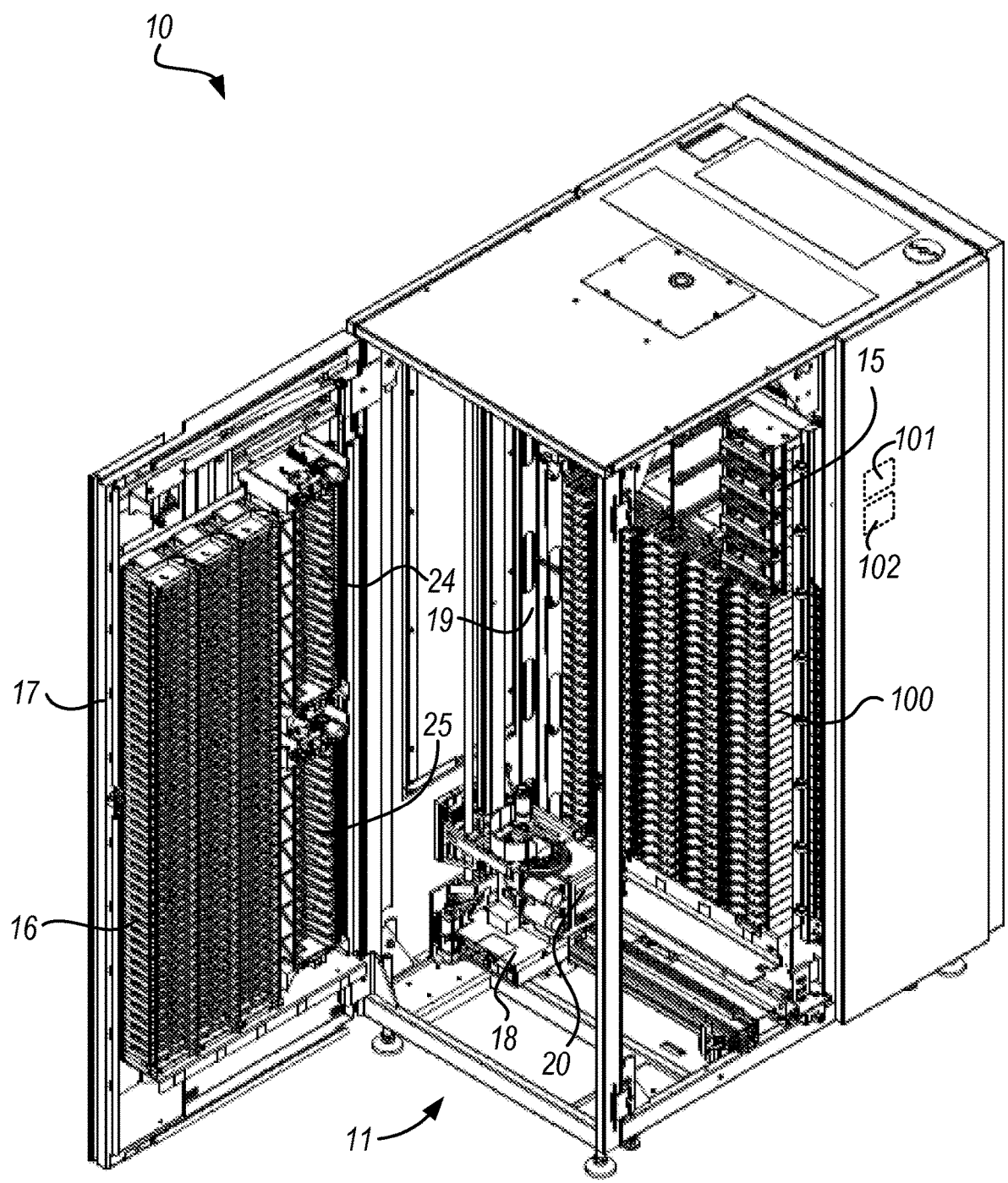
FIG. 2 is a perspective view of a storage frame from the data storage library of FIG. 1 in accordance with one embodiment of the present invention.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM® 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

The library 10 of FIG. 1 comprises a humidity sensor 101. A humidity sensor 101 may be a capacitive sensor, a resistive sensor, a thermally conductive sensor, etc. The humidity sensor 101 may be any humidity sensor known in the art. In preferred embodiments, the humidity sensor 101 measures and/or calculates the humidity and/or relative humidity. In other preferred embodiments, the humidity sensor 101 provides measurements to a computer, a processor, a tape library host, a drive host, etc. for calculating a relative humidity as would be understood by one having ordinary skill in the art upon reading the present disclosure.

The library 10 of FIG. 1 comprises a temperature sensor 102. A temperature sensor 102 may be a negative temperature coefficient (NTC) thermistor, a resistance temperature detector (RTD), a thermocouple, a semiconductor-based sensor, an infrared sensor, a bimetallic device, a thermometer, a change-of-state sensor, etc. The temperature sensor 102 may be any temperature sensor known in the art. In preferred embodiments, the temperature sensor 102 outputs and/or provides temperature measurements in any manner known in the art to any other sensor, processor, computer, tape library, tape drive, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disc drives, magnetic tape drives, solid state drives having non-volatile random access memory (NVRAM) such as Flash memory, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner or other reading system, such as a cartridge memory reader or similar system mounted on the gripper assembly 20, to "read" identifying information about the data storage media.

Figure 3:
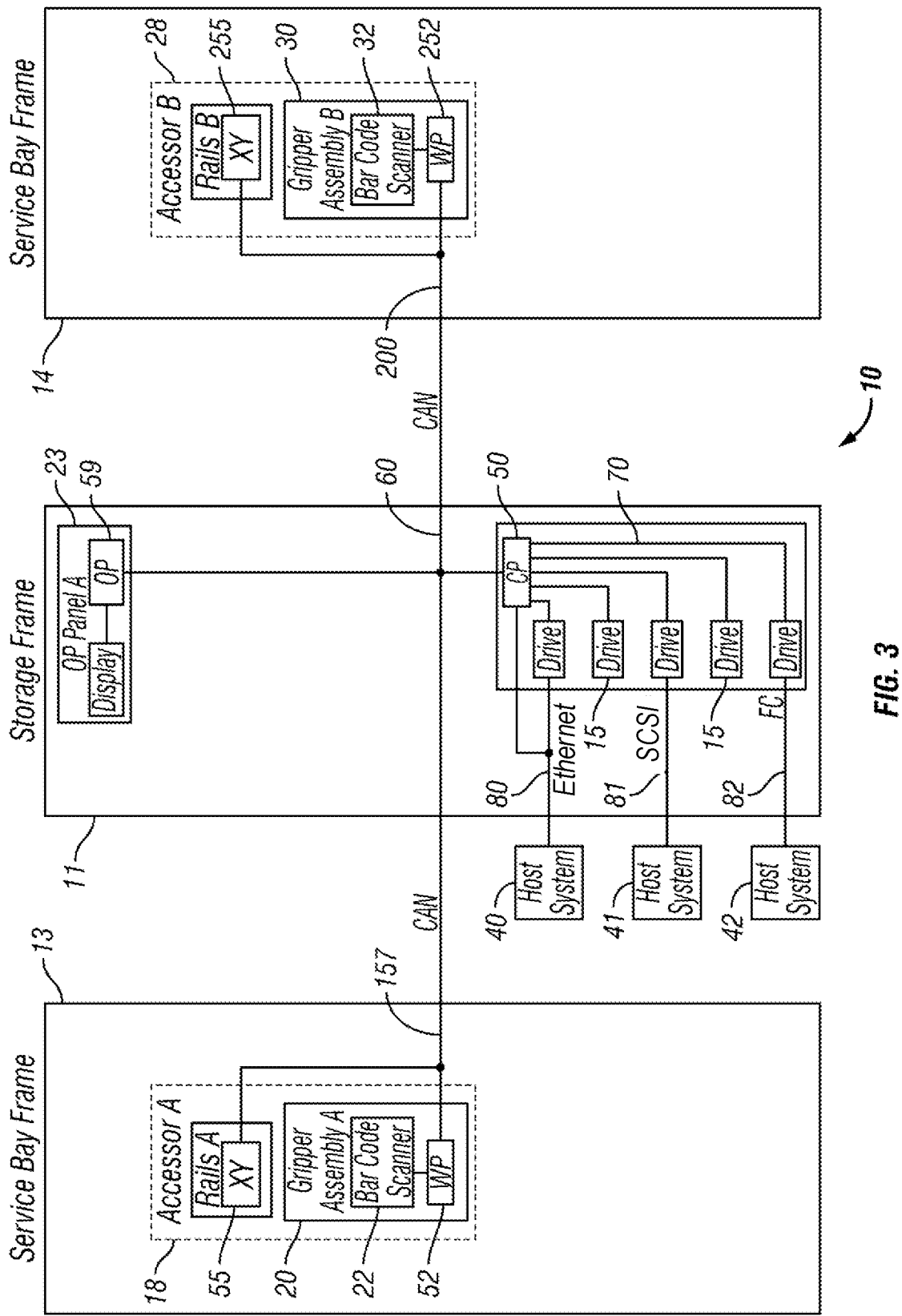
FIG. 3 is a block diagram of an automated data storage library in accordance with one embodiment of the present invention.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations.

Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel thereal-ong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA®, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be Ethernet and a SCSI bus, respectively, e.g., and may serve as host connections. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
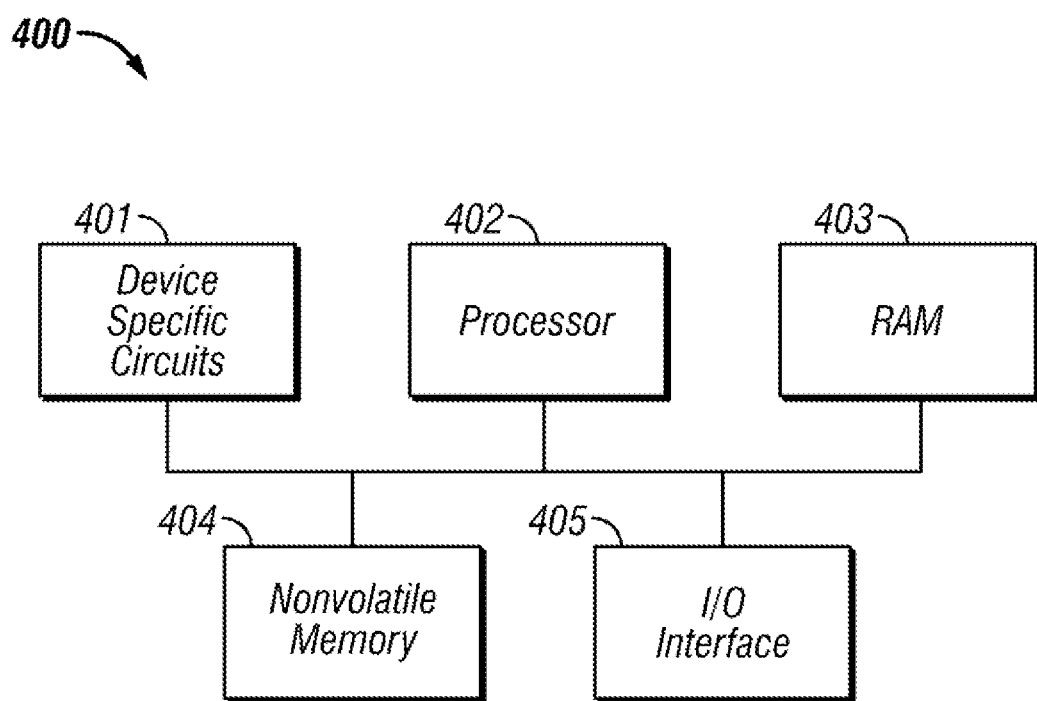
FIG. 4 is a block diagram depicting a controller configuration in accordance with one embodiment of the present invention.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
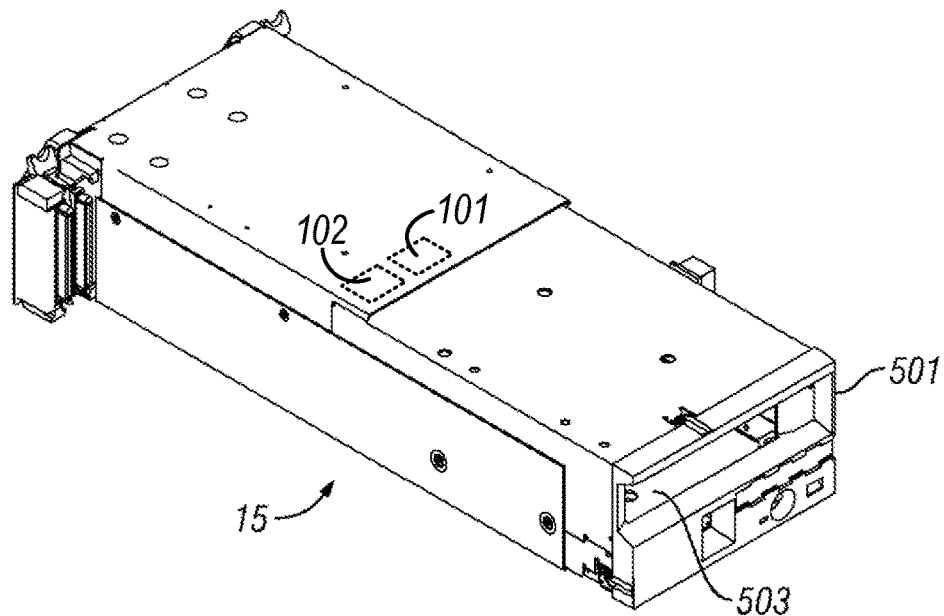
FIG. 5A is a front perspective view of a data storage drive in accordance with one embodiment of the present invention.
Figure 5B:
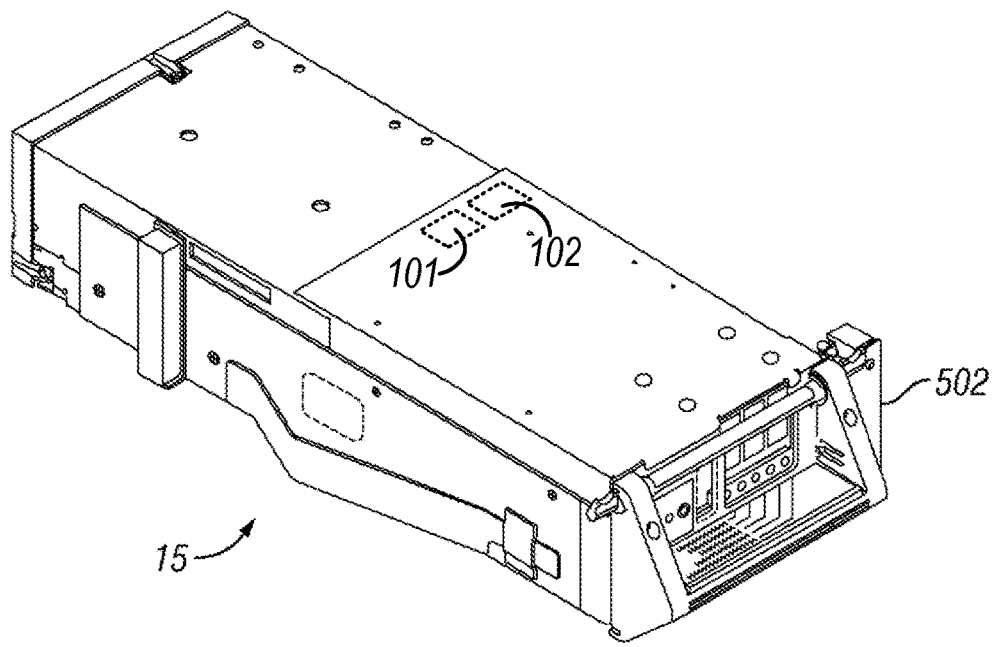
FIG. 5B is a rear perspective view of the data storage drive of FIG. 5A in accordance with one embodiment of the present invention.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

A data storage drive 15 comprises a humidity sensor 101. A humidity sensor 101 may be a capacitive sensor, a resistive sensor, a thermally conductive sensor, etc. The humidity sensor 101 may be any humidity sensor known in the art as described in FIG. 1.

A data storage drive 15 comprises a temperature sensor 102. A temperature sensor 102 may be a negative temperature coefficient (NTC) thermistor, a resistance temperature detector (RTD), a thermocouple, a semiconductor-based sensor, an infrared sensor, a bimetallic device, a thermometer, a change-of-state sensor, etc. The temperature sensor 102 may be any temperature sensor known in the art as described in FIG. 1.

Figure 6:
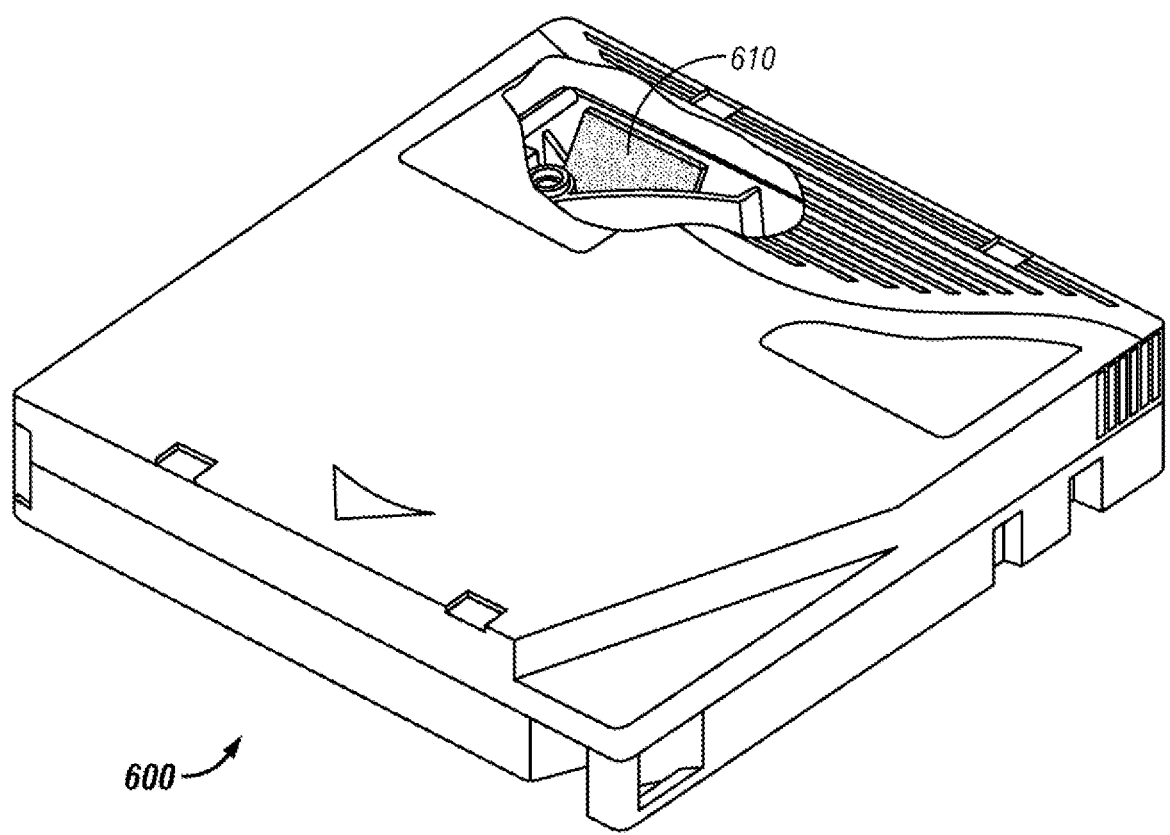
FIG. 6 is perspective view of a data storage cartridge having a cutaway portion, in accordance with one embodiment of the present invention.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick®, etc.; etc., or other suitable media. Moreover, an example of a data storage cartridge that is widely employed in automated data storage libraries for mass data storage is a magnetic tape cartridge in which the media is magnetic tape.

Figure 7A:
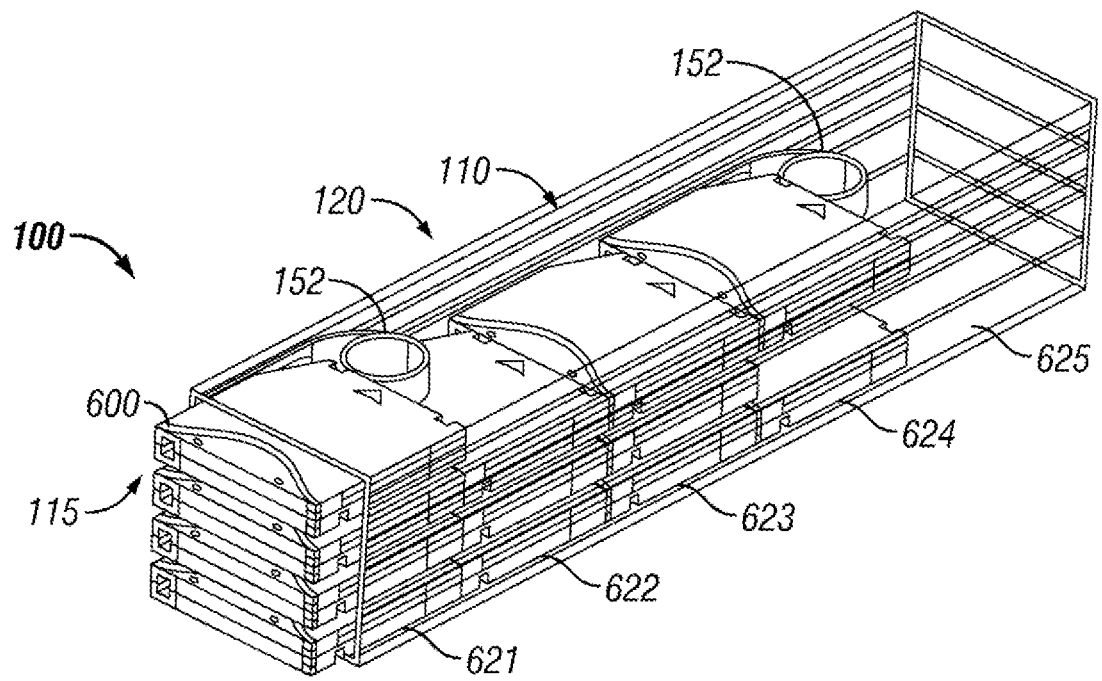
FIGS. 7A-7B are perspective views of a multi-cartridge deep slot cell in accordance with one embodiment of the present invention.
Figure 7B:
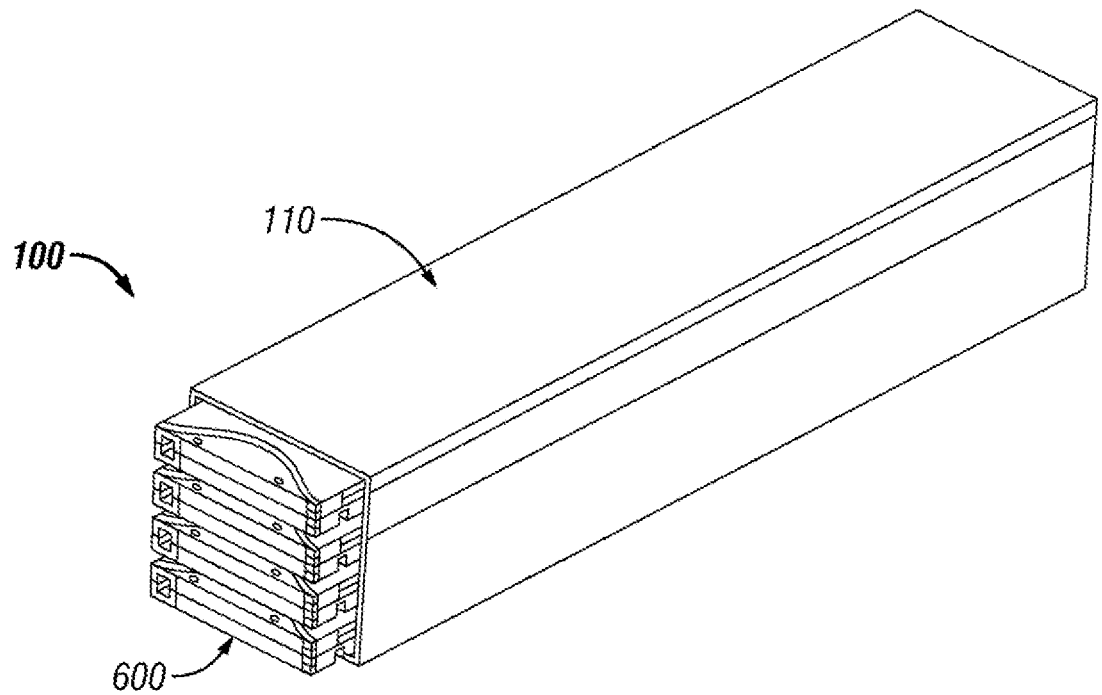

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8A:
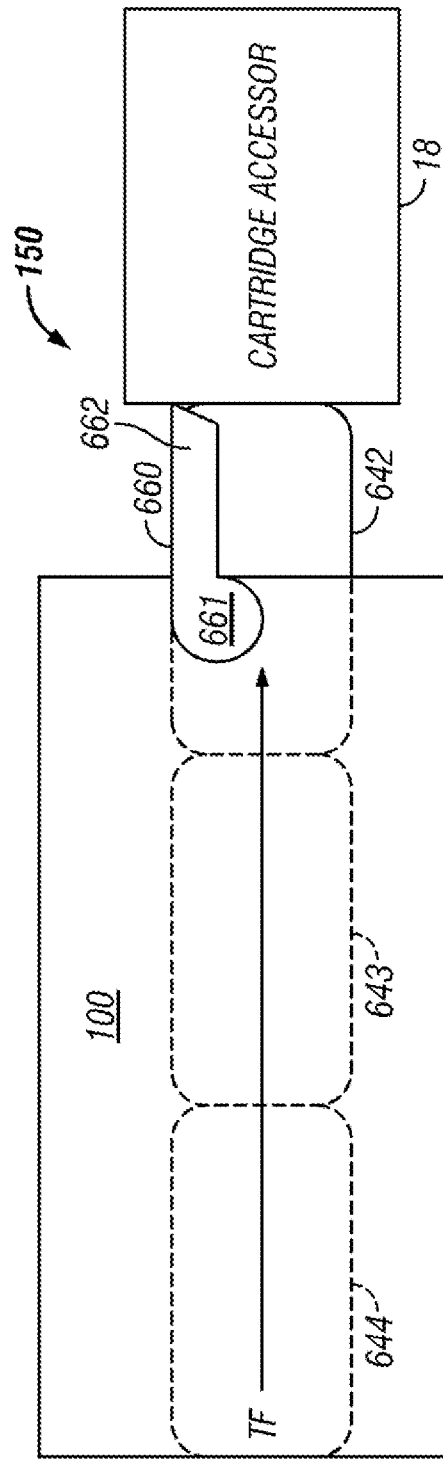
FIGS. 8A-8D are partial side views of a cartridge blocking mechanism in accordance with one embodiment of the present invention.

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

Figure 8B:
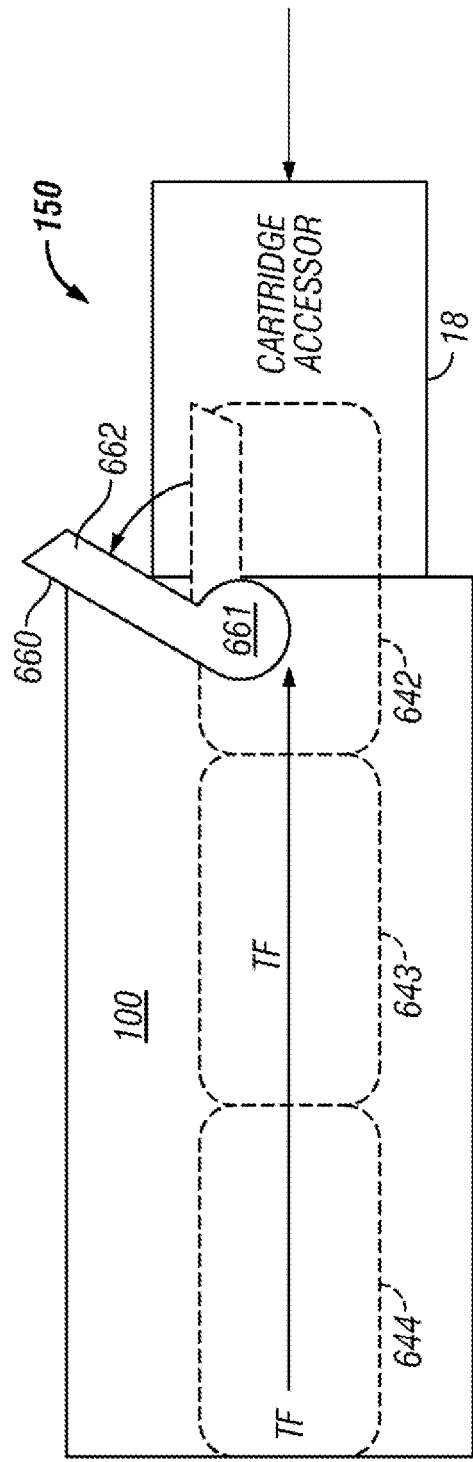
Figure 8C:
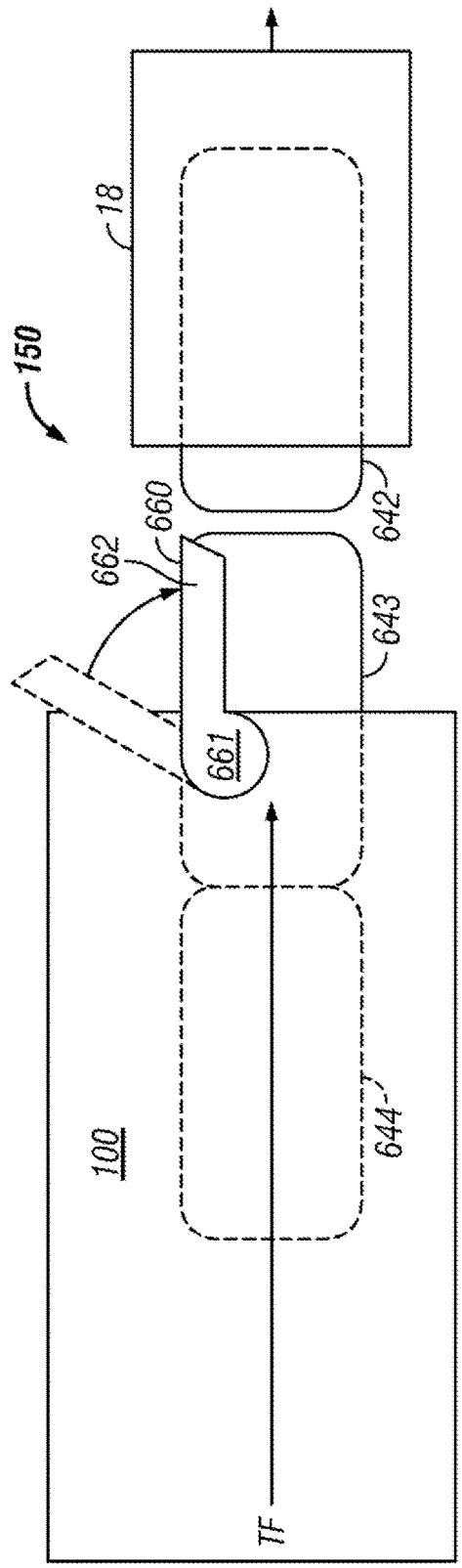

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Figure 8D:
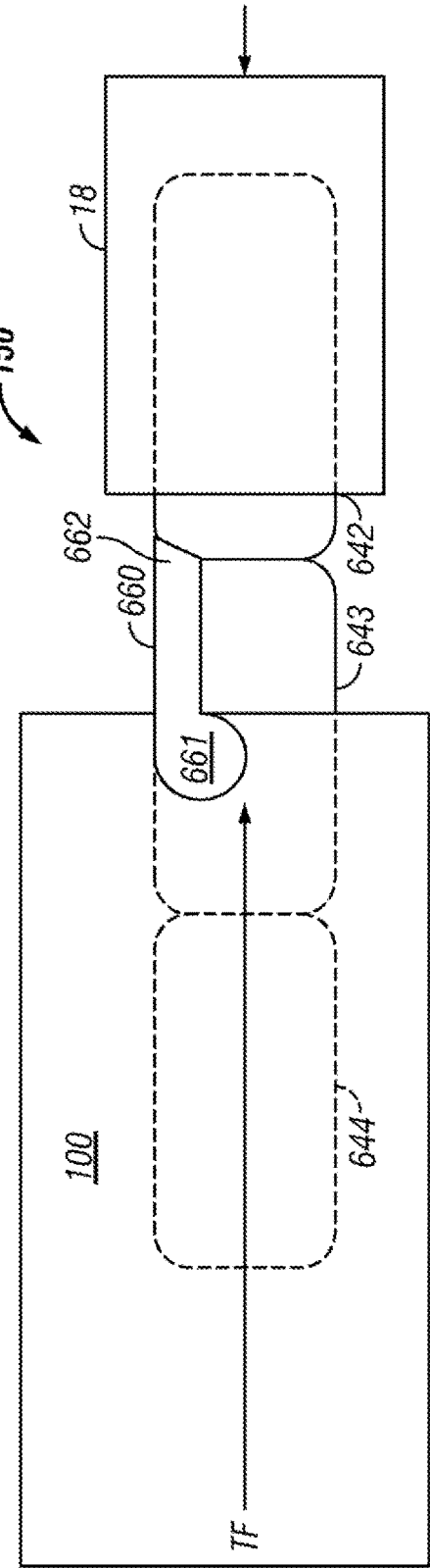

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
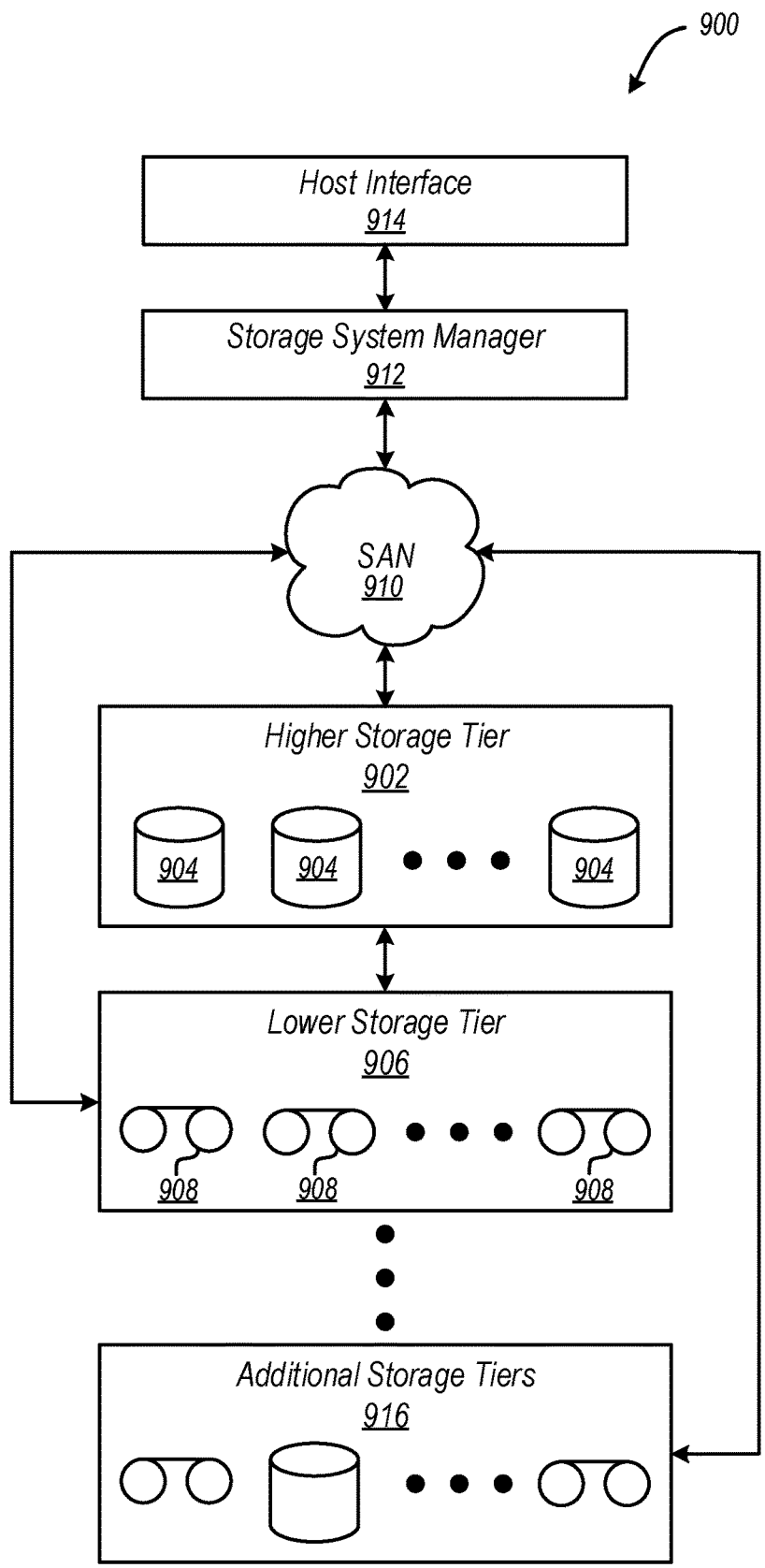
FIG. 9 is a depiction of a tiered data storage system in accordance with one embodiment of the present invention.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

A continuing effort exists in the data storage industry for improving efficiency in terms of cost and environmental impact. Many customers wish to optimize data center operating margins to improve the cost efficiency of data centers. One conventional method which attempts to improve the cost efficiency of data center operations includes allowing more fluctuations in the internal environment (e.g., temperature and/or humidity) of the data centers. Conventional techniques for controlling the internal environment of the data centers include "free cooling" and "green data center" technologies where datacenters use relatively more outside air to cool the data centers. These techniques are in contrast to the traditional air conditioning techniques which require significantly more energy and expense to operate. These types of industry initiatives are driving the requirements of data storage hardware vendors to support broader environmental specifications. Broader ranges in environmental specification allow equipment to operate in hotter, wetter, colder, drier, etc., conditions than traditional environmental conditions.

Tape storage vendors are seeing similar requests for increasing the environmental specification limits. The underlying technology of tape (e.g., magnetic storage medium) provides significant challenges for accommodating these requests. For example, tape drives and tape media are negatively impacted by extremely hot and/or wet conditions (e.g., environments that are 95 degrees Fahrenheit or higher, environments that have 80% relative humidity or higher, etc.). Several systems have been proposed which add air conditioning units to tape libraries to keep the inside of the tape library and/or tape drive enclosure cooler and/or drier than the hot and/or wet environment outside the tape libraries. These systems address issues which arise when the conditions in the internal environment of the data center are relatively hot and/or wet (e.g., summer conditions). However, air conditioning systems do not address issues arising from climate changes in the data center to relatively colder and/or drier conditions (e.g., winter conditions). Additional air conditioning systems do not address the need to expand the environmental limits of data storage to include colder and/or drier environments.

One known solution to address relatively dry environments in data centers includes adding humidifiers to the data centers. Additional humidifiers increase the humidity in the air to avoid issues arising from the negative impact of low humidity on tape products. However, humidifiers are expensive and require additional plumbing in the data center in order to provide the water needed to humidify the air. Humidifiers also increase the failure possibilities within the data center including potential leaky pipes, leaky humidification equipment, faulty controls, etc.

In stark contrast, various embodiments disclosed herein provide a more cost efficient method to safely protect the tape media and associated tape drives in a tape library. At least some embodiments provided herein use temperature and/or humidity sensors in the tape library and/or tape drive in the tape library to reduce and/or prevent damage to the tape drives and tape media in low humidity environments.

Tape media is capable of being stored in low humidity environments with no adverse effects. For example, tape media generally does not experience any notable damage in a tape cartridge sitting on a storage shelf in a tape library with a low humidity environment. However, the interface between tape media and a read/write head in a tape drive may be damaged in low humidity environments as the tape is pulled across the tape head drive surface. Tape media may be damaged in low humidity environments where the tape media is loaded into a tape drive for reading and/or writing. The low humidity results in additional wear on the tape head due to debris buildup. The debris build up leads to additional issues when the tape drive attempts to read/write the data from/to the tape media. Tape media tends to become brittle, stiff, and/or abrasive at low humidities and/or low temperatures. For example, various tape media vendors provide shipping specifications suggesting a minimum of 5% relative humidity but operational specifications suggesting a minimum of 20% relative humidity.

Data storage preferably includes protection for data written to magnetic tape storage media. Various embodiments described herein provide a method for protecting the tape media during low humidity and/or low temperature events. At least some embodiments described herein take advantage of modern automated tape libraries which are equipped with temperature and humidity sensors that monitor the environment inside the tape library where the tape media and tape drives are stored. Tape drives may also be equipped with humidity and/or temperature sensors for monitoring the humidity and/or temperature inside the tape drive in some embodiments. Various embodiments disclosed herein determine whether the humidity level and/or temperature inside the tape library and/or tape drives drops below the safe operational parameters of the tape drives and media.

Throughout the present disclosure, for any operations performed in response to detection of a relatively low humidity (e.g., humidity level) and/or a humidity outside a predefined range, the same or substantially similar operations may be performed in response to detection of temperatures outside a predefined range (e.g., relatively low temperatures).

Figure 10:
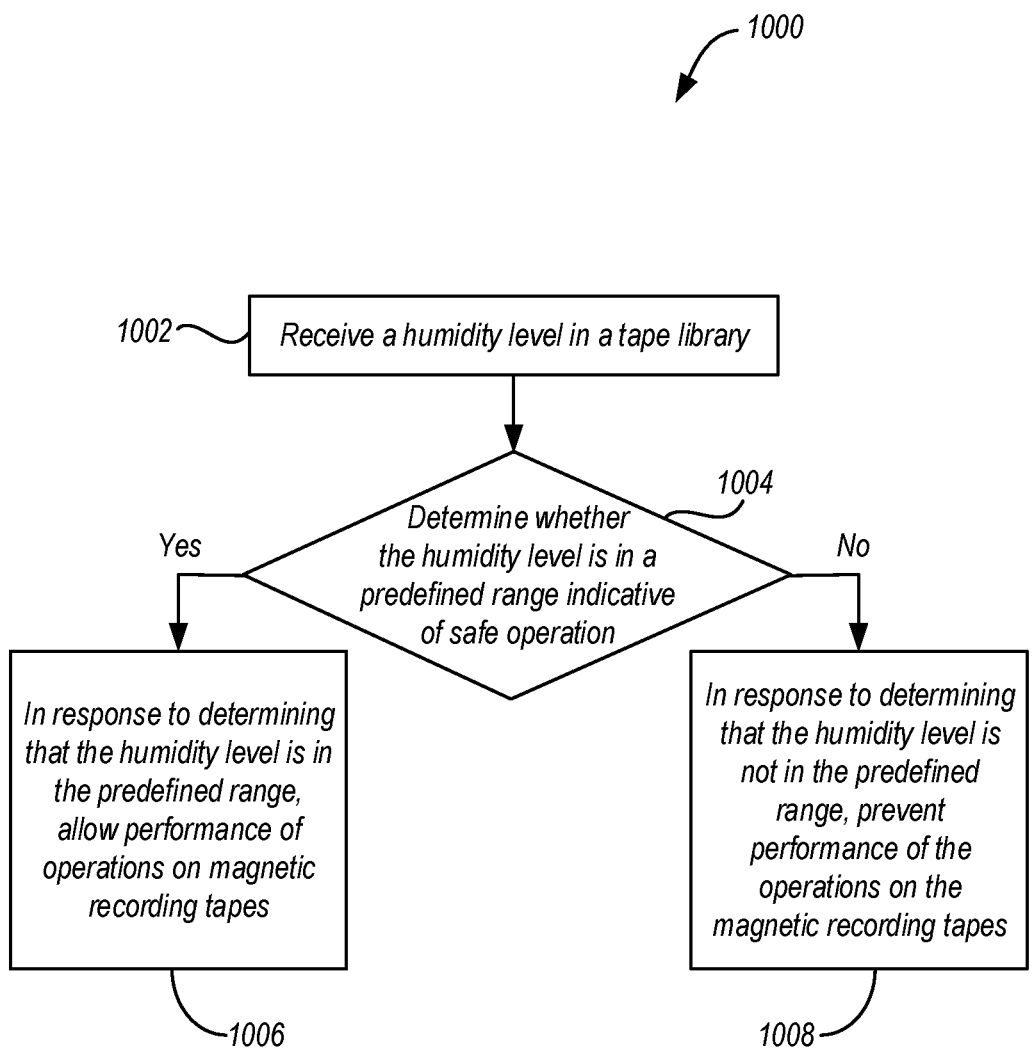
FIG. 10 is a flowchart of a method in accordance with one embodiment of the present invention.

Now referring to FIG. 10, a flowchart of a method 1000 is shown according to one embodiment. The method 1000 may be performed in accordance with the present invention in any of the environments depicted in FIGS. 1-9, among others, in various embodiments. Of course, more or less operations than those specifically described in FIG. 10 may be included in method 1000, as would be understood by one of ordinary skill in the art upon reading the present descriptions.

Each of the steps of the method 1000 may be performed by any suitable component of the operating environment. For example, in various embodiments, the method 1000 may be partially or entirely performed by computer, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 includes operation 1002 which comprises receiving a humidity level in a tape library. The humidity level may be received in any manner known in the art. In preferred embodiments, the humidity level includes a relative humidity level. In an alternative embodiment, the humidity level includes a humidity measurement which may be used to calculate the relative humidity in any manner known in the art.

In one approach, the humidity level may be measured by humidity sensor. The humidity sensor may be any humidity sensor known in the art. For example, the humidity sensor may be a capacitive sensor, a resistive sensor, a thermally conductive sensor, etc. In preferred embodiments, the humidity sensor measures and/or calculates the humidity and/or relative humidity.

In preferred approaches, the humidity level is received from a sensor in the tape library. In some approaches, the sensor is outside the tape drives in the tape library. For example, the humidity sensor may be mounted on the robotic accessor, coupled to a wall of the tape library, etc. In other approaches, the sensor is in one of the tape drives. In yet another approach, the humidity level is received from one or more sensors in the tape library outside the tape drives in the tape library and from one or more sensors in the tape drives. In approaches where multiple humidity levels are received, the humidity levels may be averaged, normalized, transformed, rescaled, adjusted, etc.

Decision block 1004 includes determining whether the humidity level is in a predefined range indicative of safe operation, or equivalently, outside a predefined range. The predefined range may be defined by a user, a manufacturer, a service provider, an operator, a specification of a magnetic recording tape, etc. Any predefined range and/or value described herein may be found in a look-up table, experimentally determined, statistically determined, a default setting, etc. In a preferred embodiment, the predefined range for the humidity level which is indicative of safe operation is greater than 20% humidity, and more preferably between 30% and 50%. It should be understood by one having ordinary skill in the art that any reference to humidity herein may alternatively refer to relative humidity.

As mentioned above, a humidity level may be interchangeable with a temperature for determining whether to suspend operations, in various embodiments disclosed herein. For example, in one approach, decision block 1004 may include determining whether a temperature is in a predefined range indicative of safe operation or equivalently outside a predefined range. In a preferred embodiment, the predefined range for the temperature which is indicative of safe operation is above 15° C., and more preferably between 16° C. and 25° C.

Operation 1006 includes, in response to determining that the humidity level is in the predefined range (and/or temperature in a predefined temperature range), allowing performance of operations on magnetic recording tapes. In preferred embodiments, the operations are predefined by a user, a manufacturer, a service provider, an operator, etc. In various embodiments, the predefined operations comprise any normal operations of the tape drive and/or tape library as would be understood by one of ordinary skill in the art upon reading the present disclosure. For example, the predefined operations may include mounting a tape cartridge, unmounting a tape cartridge, loading a tape cartridge, unloading a tape cartridge, reading data on tape media, writing data to tape media, etc.

In one approach, the tape library allows performance of operations on magnetic recording tapes. For example, the library controller may perform operation 1006. In another approach, a tape drive allows performance of operations on magnetic recording tapes. For example, a tape drive may notify a library to allow performance of operations on magnetic recording tapes.

Alternatively, operation 1008 includes, in response to determining that the humidity level is not in the predefined range (and/or temperature is not in a predefined temperature range), preventing performance of operations on magnetic recording tapes. In various approaches, preventing performance of operations may include preventing commencement of operations and/or suspending operations which are already in progress. In preferred embodiments, the operations are those normally performed by a tape drive and/or tape library, but may also include operations predefined by a user, a manufacturer, a service provider, an operator, etc. In various embodiments, the operations comprise reading data on tape media, writing data to tape media, etc. Other operations may be allowed in response to determining that the humidity level is not in the predefined range. In one approach, allowed operations include loading a tape cartridge, unloading a tape cartridge, and any other operations that are not problematic in and/or affected by low humidity and/or relative humidity.

In one approach, the tape library prevents performance of operations on magnetic recording tapes. For example, the library controller may perform operation 1008. In another approach, the tape drive prevents and/or assists in preventing performance of operations on magnetic recording tapes. For example, a tape drive may suspend its operations autonomously, notify a library to prevent performance of operations on magnetic recording tapes, etc.

In various approaches, causing suspension of performance of operations on magnetic recording tapes includes sending a message to tape drives in the tape library to stop and/or delay the operations. The message may be sent to the tape drives in the tape library in any manner known in the art.

In other approaches, causing suspension of performance of operations on magnetic recording tapes includes rejecting host commands (e.g., by the tape library) to load and/or mount tape cartridges. The tape cartridges preferably comprise the magnetic recording tapes.

In various embodiments, method 1000 includes, after preventing performance of operations on magnetic recording tapes, allowing resumption of performance of operations on magnetic recording tapes in response to determining that the humidity level is in the predefined range. The humidity level in the tape library may be updated and/or received continuously, periodically according to a predefined interval, spontaneously, in response to a triggering event (e.g., after a predefined period of time, in response to determining a change in the humidity level, in response to a request for the humidity level (e.g., from a user, a manufacturer, an operator, etc.)), etc.

In a preferred embodiment, the resumption of performance may be allowed after a predefined acclimation period. The predefined acclimation period may be a set period of time which is set by a default setting, a user, a manufacturer, an operator, experimentally determined, etc. The predefined acclimation period may be associated with the humidity reading and the predefined acclimation period found in a look-up table in one approach.

In one exemplary configuration, a tape library may extend an acclimation period by preventing operations on magnetic recording tapes after the time for the predefined acclimation period has lapsed. For example, tape library may detect that the humidity level enters into the predefined range during an acclimation period. The tape library may extend the acclimation period such that the humidity level is in the predefined range during an entire length of the predefined acclimation period. For example, the humidity level may be in the predefined range for the last hour of a 6 hour acclimation period. The tape library may extend the acclimation period (e.g., suspension of operations) for another 5 hours such that the humidity level is in the predefined range for a full, 6 hour acclimation period. Specifically, the tape library may override tape drives which alternate between humidity levels in the predefined range and humidity levels outside the predefined range until the humidity level reaches a steady state for an entire acclimation period and/or another predefined period of time.

In one embodiment, the method 1000 includes receiving the humidity level from a drive in the tape library, and in response to determining that the humidity level in the drive is not in a second predefined range, preventing the drive from performing operations on magnetic recording tapes. In some approaches, the second predefined range may be the same range as the predefined range for the humidity level in a tape library. In other approaches, the second predefined range may be defined by a user, a manufacturer, a service provider, an operator, etc. Any predefined range and/or value described herein may be found in a look-up table, experimentally determined, statistically determined, a default setting, etc.

In one embodiment, method 1000 includes receiving a message from a drive in the tape library indicating that the humidity level in the drive is not in the second predefined range. The message may be received in any manner known in the art. In response to receiving the message, the method 1000 includes not requesting that the drive perform operations on magnetic recording tapes. In response to receiving the message, the method 1000 includes not requesting loading and/or mounting tape cartridges. In other approaches, in response to receiving the message, the method 1000 includes instructing the drive to suspend operations as described in detail above.

In one embodiment, method 1000 is drive-implemented as would become apparent to one having ordinary skill in that art upon reading the present disclosure. For example, operation 1002 may include detecting a humidity level in a housing of a tape drive. Various embodiments described above may be drive-implemented for allowing and/or preventing performance of any operations described above. Various messages as described above may be sent to a tape library of which the tape drive is a component.

In various embodiments, humidity may be added to (e.g., injected into) the tape library and/or tape drive in response to determining that the humidity level is outside the predefined range which is indicative of safe operational performance for the tape drives and/or tape media. Humidity may be added to the tape library and/or tape drive in any manner known in the art. The method 1000 may include, after a predetermined amount of time has elapsed since the humidity has been added, receiving an updated humidity level from a humidity sensor.

In various embodiments, a humidity level and/or a temperature may be determined based on readings and/or data derived from a plurality of sensors. Specifically, a humidity level and/or temperature preferably relies on more than one sensor. For example, in one approach, the humidity level and/or temperature may be an average of readings from all sensors in the tape library and/or tape drive. In another approach, the highest and/or a lowest reading in a plurality of readings may be discarded and an average of the remaining readings from the plurality of sensors may be calculated to determine the humidity level and/or temperature. In other approaches, outlier sensor readings may be discarded from various calculations for the humidity level and/or temperature where the outlier reading is likely indicative of a damaged sensor.

In various embodiments, operations on magnetic recording tapes may be allowed to continue depending on the length of the write job where the operations on magnetic recording tapes are otherwise suspended and/or prevented. For example, if the humidity level and/or temperature is not in the predefined range and the tape drive is in the middle of a 6 hours write job, the write operations on the magnetic recording tapes may be allowed to continue.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as processor 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving a humidity level in a tape library;
determining whether the humidity level is in a predefined range indicative of safe operation for tape drives and/or tape media in the tape library;
in response to determining that the humidity level is not in the predefined range, preventing performance of operations on magnetic recording tapes for at least a predefined acclimation period; and
after preventing performance of operations on magnetic recording tapes,
overriding a tape drive which alternates between humidity levels in the predefined range and humidity levels outside the predefined range until the humidity level in the drive reaches a steady state for a period of time at least equal to the entire predefined acclimation period.

2. The method as recited in claim 1, wherein preventing performance of operations on magnetic recording tapes includes sending a message to tape drives in the tape library to stop and/or delay the operations.

3. The method as recited in claim 1, wherein preventing performance of operations on magnetic recording tapes includes rejecting host commands to load and/or mount tape cartridges.

4. The method as recited in claim 1, wherein the humidity level is received from a sensor in the tape library, the sensor being outside tape drives in the tape library.

5. The method as recited in claim 1, comprising, while the humidity level in the tape library is in the predefined range, receiving a humidity level from a drive in the tape library, and in response to determining that the humidity level in the drive is not in a second predefined range, preventing the particular drive from performing operations on magnetic recording tapes.

6. The method as recited in claim 1, comprising, while the humidity level in the tape library is in the predefined range, receiving a message from a drive in the tape library indicating that the humidity level in the drive is not in a second predefined range; and in response to receiving the message, not requesting that the particular drive perform operations on magnetic recording tapes.

7. The method as recited in claim 1, wherein the humidity level in the tape library is received from a plurality of sensors in the tape library, wherein the humidity level is an average of the humidity levels received from the plurality of sensors.

8. The method as recited in claim 1, comprising, in response to determining that the humidity level is below the predefined range, preventing performance of the operations on magnetic recording tapes.

9. The method as recited in claim 1, comprising retrieving the predefined acclimation period from a look-up table, the predefined acclimation period being associated with a humidity reading.

10. The method as recited in claim 1, comprising allowing performance of a write operation to continue on one of the magnetic recording tapes in response to determining that the write operation was started before the humidity level moved out of the predefined range.

11. The method as recited in claim 5, wherein the humidity level in the tape library is received from a plurality of sensors in the tape library, wherein the humidity level is an average of the humidity levels received from the plurality of sensors.

12. A system, comprising:
a processor; and
logic integrated with the processor, executable by the processor, or integrated with and executable by the processor, the logic being configured to:
receive a humidity level in a tape library;
determine whether the humidity level is in a predefined range indicative of safe operation for tape drives and/or tape media in the tape library;
in response to determining that the humidity level is not in the predefined range, prevent performance of operations on magnetic recording tapes for at least a predefined acclimation period; and
after preventing performance of operations on magnetic recording tapes, overriding a tape drive which alternates between humidity levels in the predefined range and humidity levels outside the predefined range until the humidity level in the drive reaches a steady state for a period of time at least equal to the entire predefined acclimation period.

13. The system as recited in claim 12, wherein preventing performance of operations on magnetic recording tapes includes sending a message to tape drives in the tape library to stop and/or delay the operations.

14. The system as recited in claim 12, wherein preventing performance of operations on magnetic recording tapes includes rejecting host commands to load and/or mount tape cartridges.

15. The system as recited in claim 12, wherein the humidity level is received from a sensor in the tape library, the sensor being outside tape drives in the tape library.

16. The system as recited in claim 12, comprising logic configured to: receive the humidity level from a drive in the tape library, and in response to determining that the humidity level in the drive is not in a second predefined range, prevent the drive from performing operations on magnetic recording tapes.

17. The system as recited in claim 12, comprising logic configured to: in response to determining that the humidity level is below the predefined range, preventing performance of the operations on magnetic recording tapes.

18. The system as recited in claim 12, comprising logic configured to: retrieve the predefined acclimation period from a look-up table.

19. A computer program product, the computer program product comprising a computer readable storage medium having program instructions embodied therewith, the program instructions executable by a computer to cause the computer to:
- receive, by the computer, a humidity level in a tape library;
- determine, by the computer, whether the humidity level is in a predefined range indicative of safe operation for tape drives and/or tape media in the tape library;
- in response to determining that the humidity level is not in the predefined range, prevent, by the computer, performance of operations on magnetic recording tapes for at least a predefined acclimation period; and
- after preventing performance of operations on magnetic recording tapes, overriding a tape drive which alternates between humidity levels in the predefined range and humidity levels outside the predefined range until the humidity level in the drive reaches a steady state for a period of time at least equal to the entire predefined acclimation period.

20. The computer program product as recited in claim 19, wherein preventing performance of operations on magnetic recording tapes includes rejecting host commands to load and/or mount tape cartridges.

21. The computer program product as recited in claim 19, wherein the humidity level is received from a sensor in the tape library, the sensor being outside tape drives in the tape library.

22. The computer program product as recited in claim 19, comprising program instructions executable by the computer to cause the computer to:
- receive, by the computer, the humidity level from a drive in the tape library, and in response to determining that the humidity level in the drive is not in a second predefined range, prevent, by the computer, the drive from performing operations on magnetic recording tapes.

23. The computer program product as recited in claim 19, comprising program instructions executable by the computer to cause the computer to: in response to determining that the humidity level is below the predefined range, preventing performance of the operations on magnetic recording tapes.

24. The computer program product as recited in claim 19, comprising program instructions executable by the computer to cause the computer to: retrieve the predefined acclimation period from a look-up table.

* * * * *